Figure 1:
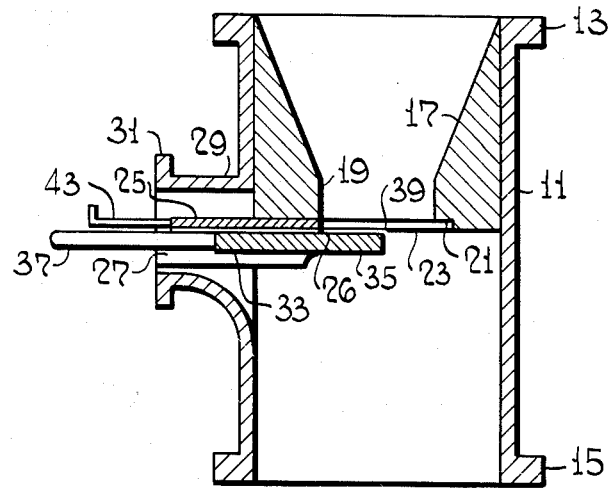

June 12, 1956 — S. O. BRONSON II — 2,749,940
SLIDE VALVE
Filed March 20, 1952

Stanley O. Bronson, II  Inventor
By Edwin M. Thomas  Attorney

United States Patent Office 2,749,940
Patented June 12, 1956

2,749,940
SLIDE VALVE

Stanley O. Bronson II, Mountainside, N. J., assignor to Esso Research and Engineering Company, a corporation of Delaware Application March 20, 1952, Serial No. 277,651

5 Claims. (Cl. 137—613)

The present invention relates to slide valves and particularly to that type of valve which is used for controlling the flow of granular abrasive solid materials such as silicious and analogous catalysts, pulverized or granulated ores and analogous solid materials. A particular feature of the invention relates to means for completely shutting off the flow of such materials in emergencies. Additional features relate to the protection of valve elements from erosion and abrasion and to the use of auxiliary cut-off means which are supported by a main slide gate control means.

In certain apparatus where granular or powdered solid materials of highly abrasive nature are handled in large volumes considerable difficulties have been encountered in valve maintenance. For example, in large fluid process catalytic crackers for hydrocarbon oils, as widely used in the petroleum industry, large quantities often amounting to many tons daily, of powdered or granular solid catalyst materials must be handled at controlled rates through valve mechanisms. The valve mechanisms which have been generally satisfactory for this type of use are those of the slide gate type. In such valves, as is well known, a sliding gate is moved across an orifice resting against a valve seat element, the longitudinal adjustment of the slide gate across the orifice serving to regulate or stop the flow of the solid material through the valve body as may be required.

When abrasive materials such as silicious and other powdered catalysts are employed, and particularly where a slide gate is partially opened to feed such materials at a controlled rate, there is rather rapid wear of the edges of the gate over which the material flows. These quickly become rounded and thereafter they do not fit accurately against the valve seat with which they cooperate. As long as flow is continued this is not serious since the slide gate can be adjusted to compensate for wear. In case of shut down, however, it may be essential to have the flow of finely divided solid material completely stopped. When the valve gate and/or the valve seat with which it cooperates have been abraded by flow of the solid material thereover it may be impossible to obtain a complete shut off. In such cases it becomes necessary to overhaul the valve and this entails expensive shut downs and other process interruptions. In the case of petroleum cracking operations, which are frequently carried on continuously for many days without interruption, a matter of shutting down for overhaul involves serious interruption and considerable expense. A principal object of the present invention is to make available emergency shut off features in conventional slide valves so as to avoid the troubles mentioned above.

Devices are shown in the prior art which are equipped with multiple cut-off plates and which have utility for controlling the flow of liquids. In general they are not suitable for purposes of the present invention for reasons which will become more apparent as this description proceeds.

A further feature of the present invention is the provision of a relatively light and inexpensive emergency cut off plate which is auxiliary to the main control valve and which may be at least partially supported by the latter to give increased rigidity and a more certain and clean cut off.

Figure 2:
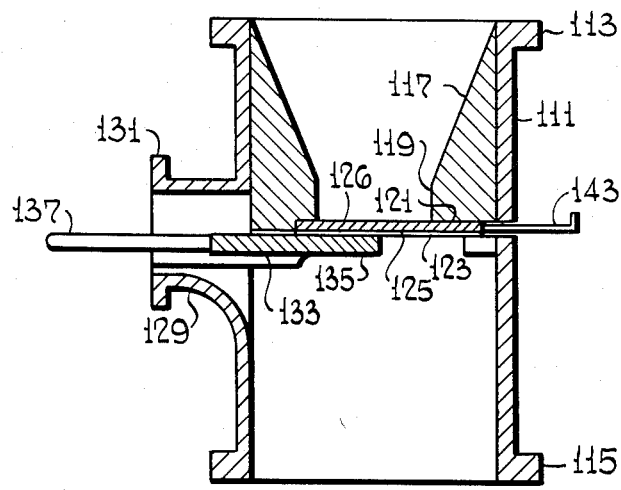

The invention will be understood more fully by reference to the attached drawings in which:

Figure 1 is a vertical sectional view through one form of slide valve embodying the present invention, and Figure 2 is a vertical sectional view of another modification of the invention.

Referring to the drawings, Figure 1 shows a valve body 11 having upper and lower flanges 13 and 15 respectively by which it may be secured to other parts of an appropriate apparatus. While the invention has particular application to the control of finely divided solid catalyst material as used in cracking of petroleum and analogous operations it may be used in any apparatus where it is desirable or necessary to obtain a uniform and controlled flow of finely divided solid abrasive particles. It is especially suitable for large scale apparatus.

Thus, the apparatus of Figure 1 may be attached at its upper flange 13 to a hopper or a conduit (not shown) leading to a hopper or the like containing a supply of the granular solid material to be handled. The lower flange 15 may be connected to other parts of the apparatus to which the granular material is to be fed.

Inside the outer valve body 11 there is provided a throat member 17 having a restricted passage 19 below which there are two seat surfaces 21 and 23. Seat surface 23 is downstream from seat surface 21 by the thickness of an auxiliary cut off plate member 25 which will be described more fully below.

A control port or opening is shown at 27, being formed integrally into the valve body 11 as defined by a branched neck element 29 terminating in a flange 31. Flange 31 may have attached thereto suitable control apparatus of any desired type for manipulating the sliding valve elements to be described.

Inside the throat member 27 there is provided a slide way 33 adapted to receive a main slide gate element 35. This may be cast or otherwise formed in the valve body and its upper surface should afford a smooth planar support for the main slide valve or gate 35. This gate member is made of any suitable material, preferably steel or other strong metal, and is of such cross section and rigidity as adequately to support whatever load may be placed upon it due to the flow, the weight, or the sudden stoppage of flow of solid matter through the valve. This main sliding gate 35 is provided with an arm or extension 37 projecting to the left in Fig. 1 by which it may be manipulated with appropriate control mechanism. The latter is of conventional type and is not shown for purposes of simplicity.

In operation under ordinary conditions the valve 35 is opened by pulling it to the left as shown in Fig. 1 to allow the solid materials to flow at the desired rate. The exposed edge of the gate as indicated at 39 gradually is worn away in normal usage by the flow of the abrasive particles and some wear occurs also around the edge of the lower seat member 23 previously mentioned. When the parts are properly fitted and newly assembled complete closing of the slide gate 35 will completely stop the flow of even the most finely divided solid material. After a short period of operation, however, this is no longer true. The finely divided solid material will continue to sift through the valve of normal construction because of the wear just described.

Immediately above the main slide gate 35, which is of rigid material as previously indicated, is a relatively thin and light auxiliary slide member 25 previously mentioned. The latter is adapted to cooperate with the upstream valve seat surface 21 so as to completely shut off the flow of powdered catalyst or other pulverulent or granular material when fully closed. Slide 25 has an extending element 43 made integrally therewith by which it may be manipulated to slide it in or out of its seat. The plate 25 rests solidly on the main slide gate 35. It is preferably provided with ribs or runners 26 which support it on plate or gate 35, to reduce friction. In some cases it may have a plane lower surface.

Ordinarily, for control of flow during operation the auxiliary gate member 25 is drawn completely out of the valve throat or opening as shown in Fig. 1. Under these conditions it is not subject to wear. Valve seat 21 is protected against any substantial wear by the overhanging portions of the valve throat 19. Even though the outer edges of the seat surface 21 are abraded, most of the plane seat surface is not damaged. Hence, valve 25 and most of the cooperating seat surface 21 are not ordinarily in contact with flowing catalyst nor are they subject to any particular degree of abrasion.

Hence, for usual operation the valve gate 35 is adjusted longitudinally to left or right to provide the proper flow control. Supplemental adjustments are made if and when abrasion of plate 35 and/or its cooperating valve seat surface 23 require adjustment. When it is desired to completely shut off the flow, the relatively unused and undamaged plate 25 of light construction is pushed across the opening to cooperate with the seat 21 and completely shut off the flow. The thickness of the plate member 35 ordinarily is not diminished in its major area so it affords complete and adequate support for the relatively light and sometimes flexible cut off member 25.

The apparatus of Fig. 1 shows both plates being operated from the same side of the valve. For most operations this is the preferred construction. In Fig. 2, however, there is shown a slightly different arrangement which may have utility in some special applications.

In Fig. 2 the valve body 111 comprises upper and lower flanges 113 and 115 respectively and a throat member 117 having a restricted orifice 119 which, at its lower face, is provided with upper and lower seat surfaces 121 and 123. The relatively light auxiliary closure plate is shown at 125 being operated by control means extending to the right, indicated at 143. The main control plate 135 has an extension to the left indicated at 137, these parts being housed within the neck 129 provided with flange 131 corresponding to similar parts in Fig. 1. As in the previously described embodiment, ribs or runners 126 may be provided on the lower surface of the auxiliary cut off plate 125 to reduce sliding friction in the presence of finely divided solids.

In both embodiments appropriate guide means are provided to hold the slide members in proper cooperation with their respective valve seats. Although wear on plates 35 or 135 prevents complete shut off, as indicated above, these plates can be used for a long time and a considerable degree of wear can be tolerated before replacement is necessary. This offers a great practical advantage over equipment of the prior art.

In former apparatus it was often necessary to overhaul the valves frequently to keep them in such condition that complete cut off could be obtained when required. With the present arrangement it is only necessary to be sure that the auxiliary members 25 or 125 are in condition for complete cut off and this is easily assured because these parts are almost entirely free from exposure to abrasion. Hence, the construction, very simple in its arrangement, affords a practical solution to an important problem in the operation of large catalytic hydrocarbon cracking apparatus and analogous equipment handling finely divided solids.

It will be understood that various modifications can be made without departing from the spirit of the invention. One of the plates might be operated at right angles to the other or at any other convenient angle as will be obvious, though the construction shown in Fig. 1 is ordinarily preferred and that in Fig. 2 would usually be the next best choice.

What is claimed is:

1. A slide valve structure, comprising in combination with a valve body, a substantially annular shoulder disposed transversely within said body and extended radially inward thereof, said shoulder dividing the interior of said body into upstream and downstream portions and defining a port connecting said portions, said shoulder further exposing an annular valve seating surface into said downstream body portion, a first valve seat peripherally of said annular seating surface extended radially inward thereof into substantially radially spaced relation to said port, a second valve seat, recessed in said shoulder annular seating surface, extended radially outward thereof from the peripheral edge of said port to the inner edge of said first valve seat, a first valve member supported within said body downstream of said port, for reciprocal movement transversely thereof and of said body in slidable, seating surface contact with said first valve seat, a second valve member at least partially supported on said first valve member upstream thereof for reciprocal movement transversely of said body and said port, in slidable, seating surface contact with said first valve member and with said second valve seat, and means for independent reciprocal movement of each of said valve members transversely of said body and said port.

2. A slide valve structure according to claim 1, wherein said second valve member is provided with a series of ribbed portions extended outwardly from the downstream surface of said member and longitudinally thereof in the direction of movement of said member, said ribbed portions adapted slidably to engage the upstream surface of said first valve member.

3. A slide valve structure according to claim 1, wherein said valve members and said means for independent reciprocal movement thereof transversely of said body and said port are adapted to provide for movement of said valve members in the same direction transversely of said body.

4. A slide valve structure according to claim 1, wherein said valve members and said means for independent reciprocal movement thereof transversely of said body and said port are adapted to provide for movement of said valve members in opposite directions transversely of said body.

5. A slide valve structure comprising in combination with a valve body having upstream and downstream end portions, a substantially annular, flow restrictive, throat member disposed in the upstream end portion of said body, said member defining both a valve port communicating between said valve body end portions and a substantially annular shouldered portion transversely of said valve body, wherein said shouldered portion provides a substantially annular valve seating surface exposed in a downstream direction of said body, a first valve seat peripherally of said annular seating surface extended radially inward thereof, into substantially radially spaced relation to said port, a second valve seat, recessed in said annular seating surface, extended radially outward thereof from the peripheral edge of said port to the inner edge of said first valve seat, a first valve member supported within said body, downstream of said port, for reciprocal movement transversely thereof and of said body, in slidable seating contact with said first valve seat, a second valve member at least partially supported on said first valve member upstream thereof for reciprocal movement transversely of said body and said port, in slidable seating contact with said first valve member and with said second valve seat, and means for independent reciprocal movement of said valve members transversely of said body and said port.

References Cited in the file of this patent

UNITED STATES PATENTS

| | | |
|---|---|---|
| 283,264 | Mallard | Aug. 14, 1883 |
| 992,027 | Morlock | May 9, 1911 |
| 586,433 | Graffin | July 13, 1897 |
| 1,192,141 | White | July 25, 1916 |
| 1,325,496 | McDowell | Dec. 16, 1919 |
| 1,753,276 | Quinn | Apr. 8, 1930 |
| 1,788,763 | Gant | Jan. 13, 1931 |
| 2,330,290 | King | Sept. 28, 1943 |